March 16, 1954     W. H. BASELT ET AL     2,671,952
METHOD OF WELDING BRAKE BEAMS
Filed Feb. 6, 1948     3 Sheets-Sheet 1

Inventor
Walter H. Baselt
and
Loren L. Whitney
by
Orin O.B. Garnes Atty.

March 16, 1954    W. H. BASELT ET AL    2,671,952
METHOD OF WELDING BRAKE BEAMS

Filed Feb. 6, 1948    3 Sheets-Sheet 2

Inventor
Walter H. Baselt
and
Loren L. Whitney
by
Orin O.B. Garner Atty.

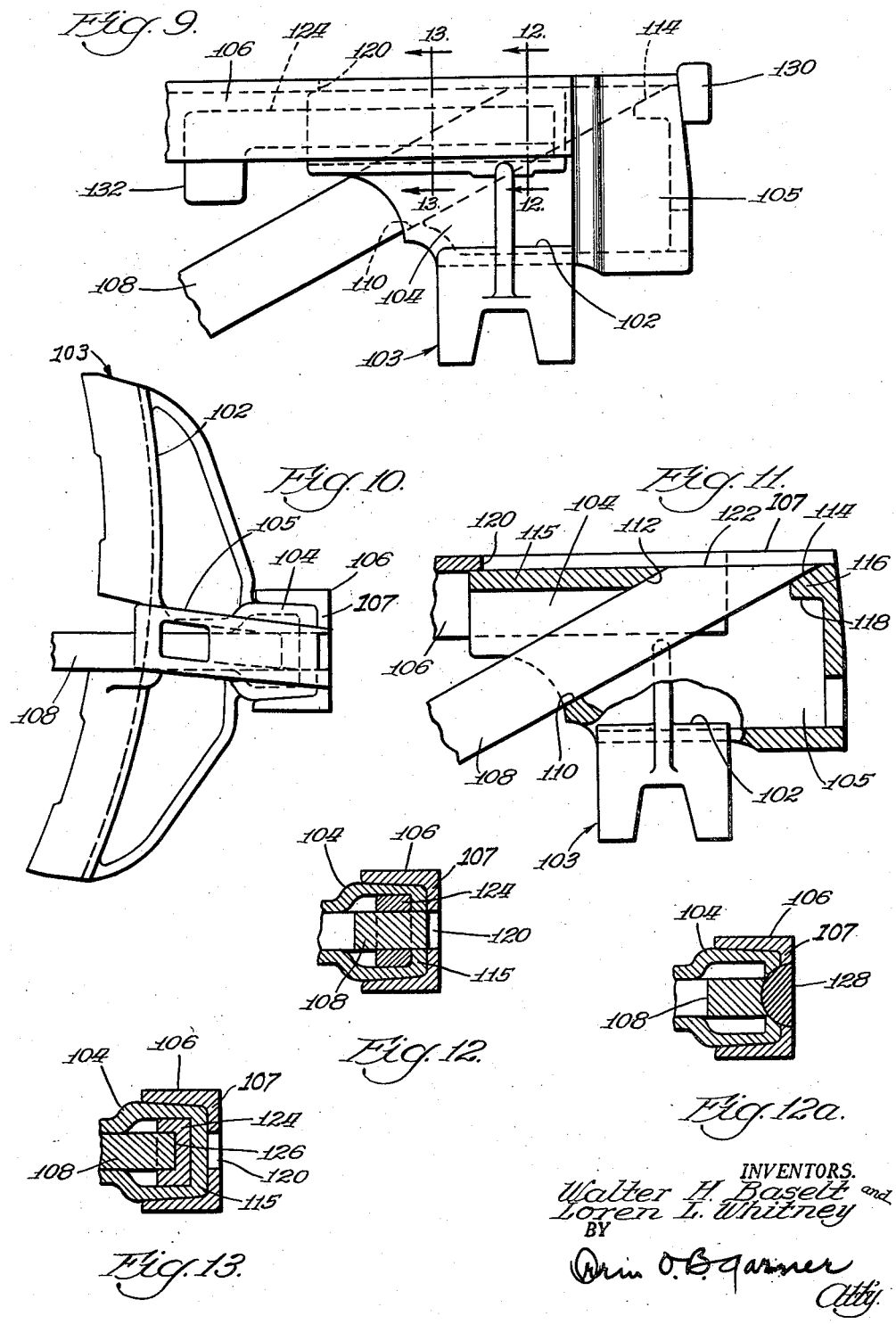

Patented Mar. 16, 1954

2,671,952

UNITED STATES PATENT OFFICE 2,671,952

METHOD OF WELDING BRAKE BEAMS

Walter H. Baselt, Chicago, Ill., and Loren L. Whitney, Hammond, Ind., assignors to American Steel Foundries, Chicago, Ill., a corporation of New Jersey Application February 6, 1948, Serial No. 6,604

2 Claims. (Cl. 29—164)

1

This invention relates to railway brake beams and more particularly to a novel method of fabricating a truss type beam. The present application is a continuation-in-part of our co-pending application, Serial No. 609,274, filed August 6, 1945, and issued March 14, 1950, as Patent No. 2,500,232 for Brake Beam.

A general object of the present invention is to provide a novel method of fabricating a truss type beam wherein the tension and compression members and the brake head at each end of the beam are welded together by a single operation.

A more specific object of the invention is to devise a method of connecting the brake beam parts at each end of the truss structure by a single weld extending longitudinally of the beam and affording an extremely strong connection capable of withstanding the loads to which such beams are subjected in railway service.

Another object of the invention is to provide the compression and brake head members with aligned slots through which the tension member is welded.

Still another object of the invention is to afford a process, such as above-described, wherein the weld metal is dammed at strategic points during a welding operation.

A more specific object of the invention is to apply a readily removable dam of non-ferrous metal having greater heat conductivity than the steel brake beam parts in a suitable position to dam the weld metal at opposite sides of the tension member within the slotted portions of the related parts.

The foregoing and other objects and advantages of the invention will become apparent from a consideration of the following specification and the accompanying drawings, wherein.

Figure 1:
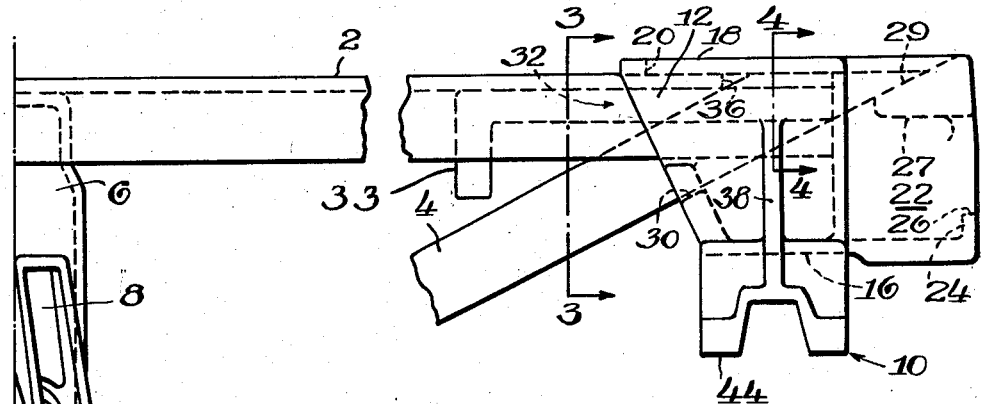
Figure 1 is a fragmentary broken top plan view of a brake beam fabricated according to the novel process, with the non-ferrous dam or chill block in applied position.
Figure 3:
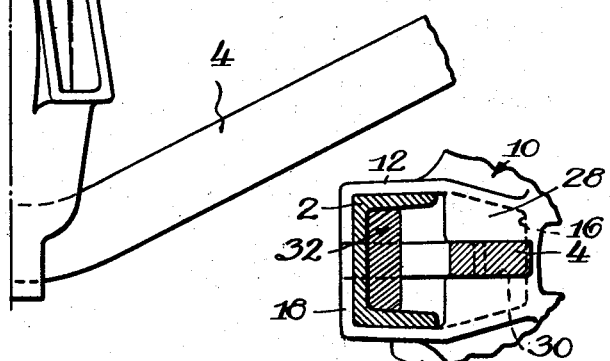
Figure 4:
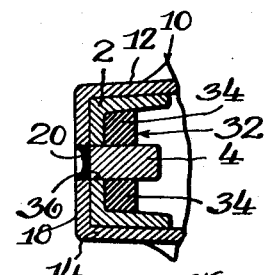
Figure 2:
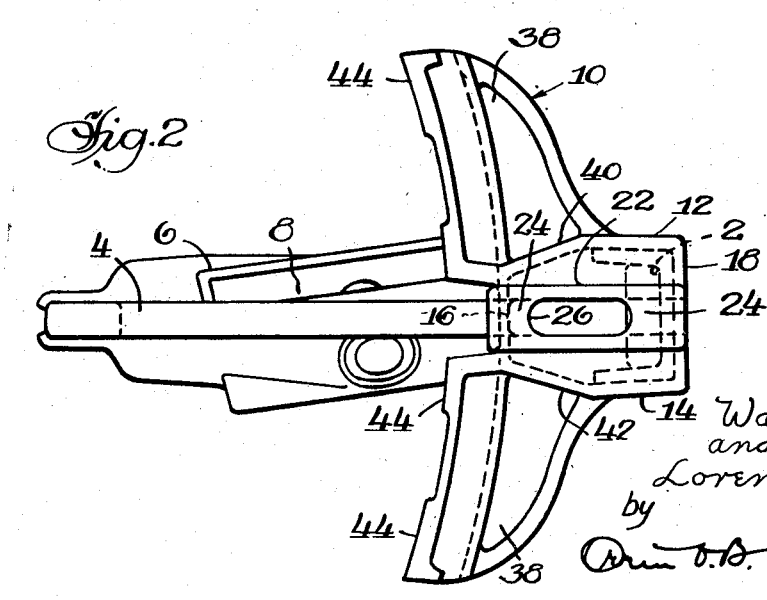
Figure 2 is an end elevation of the structure shown in Figure 1.
Figure 7:
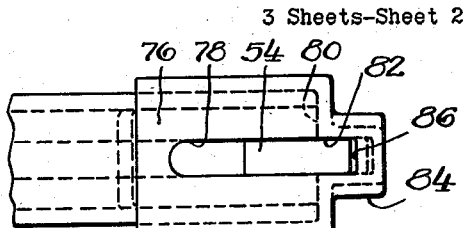
Figure 5:
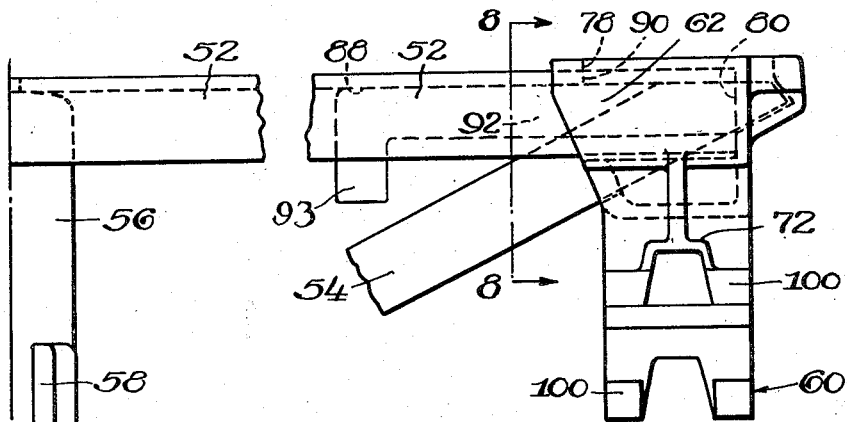
Figure 6:
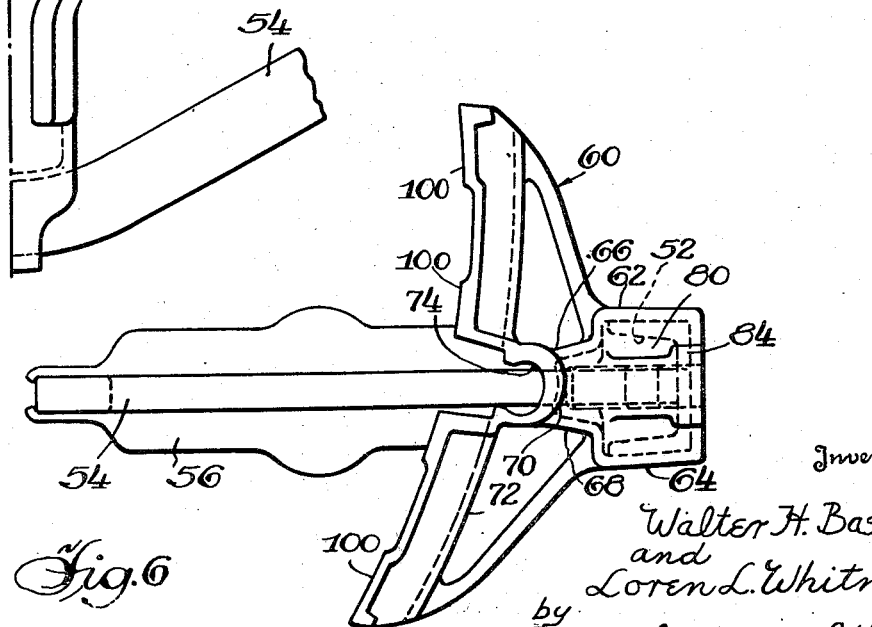

Figures 3 and 4 are sectional views taken respectively in the vertical planes indicated by the lines 3—3 and 4—4 of Figure 1;

Figure 5 is a fragmental broken top plan view of a different type of beam fabricated according to the novel method, with the dam or chill block in applied position;

Figure 6 is an end elevation of the structure shown in Figure 5;

Figure 7 is a fragmentary rear elevational view of the structure shown in Figure 5;

2

Figure 8:
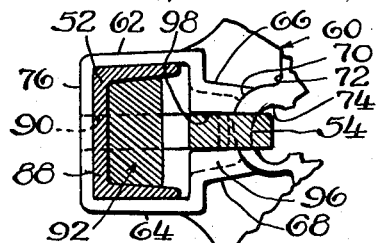

Figure 8 is a sectional view on the line 8—8 of Figure 5; and

Figures 9 to 13 illustrate the novel method as applied to still another form of brake beam, Figure 9 being a fragmentary top plan view of the brake beam parts prior to welding, Figure 10 being an end view of the structure shown in Figure 9, Figure 11 being a top plan view with portions of the structure broken away to clarify the arrangement, Figure 12 being a sectional view on the line 12—12 of Figure 9, Figure 12A being a view comparable to Figure 12 but subsequent to the welding operation and with the dam block removed, and Figure 13 being a sectional view on the line 13—13 of Figure 9.

Describing the novel process in detail and referring first to the fabrication of the beam shown in Figures 1 to 4, the brake beam parts which are conventionally formed of steel are assembled in the manner shown in the drawings and are then welded together in a single process at each end of the beam, only one end of which is shown in the drawings inasmuch as the structure is symmetrical about its transverse center line.

The brake beam comprises a truss structure including a channel or U-section compression member 2, a tension member or element 4, and a fulcrum 6 connected therebetween, said fulcrum being slotted as at 8 to accommodate an associated brake lever (not shown). Each end of the beam is provided with a brake head 10 comprising a box-section portion including top and bottom walls 12 and 14, a front wall 16, and a rear wall 18 slotted as at 20 for the purpose hereinafter described. The outer or outboard end of the box-section portion of the brake head is offset to afford a relatively narrow guide part or boss 22 projecting outwardly from the brake head and adapted for reception within a guide bracket of an associated truck frame (not shown).

The top and bottom walls 12 and 14 are connected at the outer extremity thereof by an end wall 24 cored away as at 26 for convenient foundry practice. It may be noted that the end wall 24 is provided adjacent the rear extremity thereof with an inwardly extending lug 27 between the offset portions of the top and bottom walls 12 and 14 and defining a socket therewith receiving the outboard end of the tension member 4. The lug 27 presents a diagonal guide surface 29 engaging the diagonal tension member 4 at the outer extremity thereof. The inner extremities of the top and bottom walls 12 and 14 are connected by an inner end wall 28 (Figure 3) with a slot or socket 30 (Figure 1) receiving the tension member 4 to afford convenient guide means therefor.

It may be noted, as best seen in Figures 1 and 4, that the tension member 4 at its outboard end is received within a complementary slot 36 in the rear web of the compression member and is seated against the rear wall 18 of the box-section portion of the brake head, the outboard end of the tension member 4 being diagonally sheared with respect to its longitudinal center line to afford a relatively great weld area contacting the slotted portion of the rear brake head wall 18.

The front wall 16 of the brake head is of conventional arcuate form and is reinforced by top and bottom vertical webs 38, 38 merging respectively with the top and bottom brake head walls 12 and 14 which are slightly offset at 40 and 42 respectively, adjacent their forward extremities which merge with the beforementioned front wall 16. The front wall 16 is formed on the forward face thereof with end and intermediate brake shoe engaging lugs 44, 44 adapted for connection in conventional manner to associated brake shoe means (not shown).

After the brake beam parts have been preassembled in the manner shown in the drawings, a bifurcated dam or chill block, generally designated 32 and formed of any suitable non-ferrous metal having relatively great heat conductivity, is fitted within the compression member 2 in abutment with the rear wall thereof, which wall is within the box-section of the brake head and is thus regarded as an inner wall relative to the brake head wall 18 which is regarded as an outer wall. The block comprises spaced legs 34 snugly embracing the tension member 4 and the block is provided with a diagonal seat at the inner ends of the legs 34, complementary to and engaging the tension member 4, as best seen in Figure 1. The block constitutes a chill or dam which freezes the weld metal immediately upon coming in contact with the block and thus prevents escaping of the molten metal from the welded connection during the welding operation. The block 32, as best seen in Figure 4, is seated against the rear wall of the compression member along both lateral margins of the slot 36 in said rear wall.

When the block is in assembled position, as shown in the drawings, the brake beam parts are welded together in a single welding pass or operation through the slot 20. This weld is preferably started at the inboard extremity of the slot 20 and is extended to a point outboard the compression member 2 and is preferably spaced from the outboard end of the tension member 4, thereby preventing leakage of the weld metal along the surfaces indicated at 29. However, if desired, the weld may be connected to the outboard end of the tension member 4 inasmuch as the lug 27 is formed and arranged to function as a dam which prevents the escape of substantial quantities of the weld metal. After the parts have been welded together, the block 32 is removed from the structure by any suitable tool engaged with an ear 33 formed on the inboard end of the block.

Thus the steel brake beam parts at each end of the beam are welded together in a single welding operation which fuses the tension and compression members and the brake head into an integral structure which is capable of withstanding the loads incurred in railway service and is also unusually light due to the fact that filler metal is eliminated by the provision of the readily removal dam or chill block 32 during the welding operation. The use of the block also eliminates the necessity for providing close fitting connections between the contacting portions of the brake beam parts to dam the weld metal.

The process is next described in connection with a standard A. A. R. brake beam in which the guide lugs at the ends of the beam are eliminated, as will be apparent from a consideration of the structure shown in Figures 5 to 8.

Each end of the beam shown in the latter figure is provided with a brake head, generally designated 60, comprising a box-section portion including top and bottom walls 62 and 64 offset adjacent their forward ends at 66 and 68 respectively, to merge with an arcuate portion 70 of the front brake head wall 72, said arcuate portion 70 defining a hanger slot 74 adapted for the reception of an associated brake hanger (not shown). The box-section portion of the brake head also comprises a rear wall 76 slotted as at 78 to accommodate a weld as hereinafter described.

The top and bottom walls 62 and 64 are connected at the outer or outboard extremities thereof by an end wall 80 slotted as at 82 for the reception of the tension member 54, and the end wall 80 is provided on the outer surface thereof with a hollow projection or lug 84 receiving the outer end of the tension member 54 which is snugly fitted within a socket or slot 86 within the lug or projection 84. The compression member 52 is snugly fitted within the box-section portion of the brake head, the top and bottom webs of the compression member being in snug abutment with the top and bottom walls 62 and 64, as best seen in Figure 8, and the rear web 88 of said compression member being in abutment with the rear web 76 of the brake head.

As best seen in Figures 5 and 8, the rear web 88 of the compression member is provided with a slot 90 extending inwardly from the outer extremity of the compression member and registering with the before-mentioned slot 78.

It may be noted that the offset portions 66 and 68 of the top and bottom brake head walls 62 and 64 are integrally formed with an inner end wall 96 comprising a slot or socket 98 receiving the tension member 54 to afford guide means therefor, as in the previously described embodiment.

The front wall 72 of the brake head is provided on the forward face thereof with end and intermediate lugs 100, 100 adapted for connection in the conventional manner to associated brake shoe means (not shown).

After the brake beams have been assembled in the manner shown in Figures 5 to 8, a bifurcated dam or chill block, generally designated 92 and formed of non-ferrous metal having relatively great heat conductivity, is fitted within the compression member 52 in snug abutment with the top and bottom and rear webs thereof. As in the previously described embodiment, the block 92 is bifurcated with legs snugly embracing the tension member 54 and is provided with a complementary diagonal surface at the inboard extremity of the legs snugly engaging the diagonal surface of the tension member 54. The block is also provided with an ear 93 for convenient removal thereof, as described in connection with Figures 1 to 4.

With the chill block in applied position, a single weld is laid in the slots 78 and 90 preferably commencing at the inboard extremities thereof and extending outwardly into the socket 86 in a single continuous welding pass or operation fusing the tension and compression members and the brake head into an integral structure, whereupon the block 92 is removed by means of the ear 93.

Figures 9 to 13 disclose the novel process as applied to a beam similar to that shown in Figures 1 to 4 except that the brake head is fitted within the compression member of the beam. In this beam the front wall 102 of the brake head 103 is provided on its rear surface with a box-section portion 104, the outboard end of which is relatively narrow to afford a hollow inclined guide portion 105 adapted for reception with the guide bracket of an associated truck frame (not shown). The box-section portion 104 is fitted within a channel or U-section compression member 106 in abutment with the rear web 107 and the tension member 108 extends through a diagonal passage through portion 104 and bears against a diagonal guide surface 110 at the inner end of said passage and against diagonal guide surfaces 112 and 114 at the outer end of the passage. The surface 112 is formed on the rear wall 115 of the brake head and the surface 114 is formed on the outer end wall 116 of the brake head portion 105. The wall 116 is provided with a lug 118 to increase the bearing area of the surface 114.

The rear web of the compression member 106 is provided with a slot 120, the outboard end of which is registered with a brake head slot defined by the surfaces 112 and 114, whereby the sheared end 122 of the tension member 108 may be welded in a single operation to the brake head wall 115 and the rear web of the compression member 106 in a single operation, as hereinafter described.

With the brake beam parts in assembled position as shown in Figures 9 to 11, a bifurcated dam or chill block 124, preferably of nonferrous metal characterized by greater heat conductivity than that of the steel brake beam parts, is inserted within the compression member, as best seen in Figures 9 and 12 to 13, with a complementary diagonal surface 126 of the block bearing snugly against the diagonal surface of the tension member 108, as best seen in Figure 13 and as heretofore described in connection with the embodiment of Figures 1 to 4. The block 124, as best seen in Figures 12 and 13, bears snugly against the rear wall 115 of the brake head to afford a chill or dam adapted to freeze the weld metal, as hereinafter described. With the block 124 in the position shown in Figures 9, 12 and 13, a weld is laid through the slot 120 beginning preferably at the inboard end thereof and proceeding outboardly against the sheared end 122 of the tension member 108 whereupon the parts are united in an integral weld indicated at 128 in Figure 12A. Preferably the weld is terminated at a point slightly inboard of the outboard extremities of the tension member 108; however, if desired, the weld may be continued to the outboard extremity of the beam and a chill block 130 (Figure 9) may be positioned against the outboard end of the brake head portion 105 to chill the weld metal and prevent flow thereof along the surface 114 into the hollow portion 105. The block 130 is preferably formed of a non-ferrous metal having greater heat conductivity than the steel brake beam parts, as heretofore discussed in connection with the blocks 32, 92 and 124.

After the weld 128 has been completed, the block 124 is removed by means of an ear 132 formed thereon and the brake beam parts are united in a single integral structure by the weld 128 (Figure 12A).

It is to be understood that we do not wish to be limited by the above-described applications of the novel process which are merely by way of illustration and not limitation inasmuch as obvious variations from the described practices will be readily apparent to those skilled in the art without departing from the spirit of the invention or the scope of the claims.

We claim:

1. In a method of fabricating a steel truss type brake beam, the steps of first positioning a welding edge of a tension member into one of a pair of registered slots through brake head and compression member walls, respectively, while positioning a bifurcated chill against opposite sides of the tension member to snugly embrace the latter and against both lateral margins and inner end of said slot, then simultaneously welding said walls and said edge to each other by depositing weld metal in the other slot by a single welding pass from one end to the other end thereof, whereby the members are fused together and flow of weld metal through said one slot, around the tension member, is dammed by said chill, and then, after the weld metal has solidified, removing the chill.

2. In a method of welding a truss type brake beam comprising a U section compression member, a tension member, and a brake head having a rear hollow portion of rectangular section, steps of first telescoping said U section and said rear hollow rectangular section to register slots in abutting walls of said respective sections, one wall being disposed rearwardly of the beam as to the other wall, while positioning a welding portion at the extremity of said tension member in position to substantially close the forward opening of said registered slots, and while positioning a bifurcated chill against the forward side of the forward wall along both lateral margins and the inner end of the slot in said forward wall and against the sides of said welding portion of said tension member, and then simultaneously welding said walls and said portion together at said slots.

WALTER H. BASELT.
LOREN L. WHITNEY.

References Cited in the file of this patent
UNITED STATES PATENTS

| Number | Name | Date |
|---|---|---|
| 969,861 | Haskell | Sept. 13, 1910 |
| 1,924,121 | Jasper | Aug. 29, 1933 |
| 2,170,121 | Busch | Aug. 22, 1939 |
| 2,185,463 | Howard | Jan. 2, 1940 |
| 2,233,455 | Larson | Mar. 4, 1941 |
| 2,239,186 | Anderson | Apr. 22, 1941 |
| 2,268,961 | Raymond | Jan. 6, 1942 |
| 2,294,650 | Bechtle | Sept. 1, 1942 |
| 2,306,612 | Buehner | Dec. 29, 1942 |
| 2,356,720 | Aurien | Aug. 22, 1944 |
| 2,493,913 | Busch | Jan. 10, 1950 |
| 2,500,232 | Baselt | Mar. 14, 1950 |